United States Patent [19]

Koerner

[11] Patent Number: 5,291,660
[45] Date of Patent: Mar. 8, 1994

[54] METHOD AND APPARATUS FOR DETERMINING CASTER AND STEERING AXIS INCLINATION ANGLES

[76] Inventor: Arthur Koerner, 3901 Waterview, Shelby Township, Macomb County, Mich. 48316

[21] Appl. No.: 955,480

[22] Filed: Oct. 2, 1992

Related U.S. Application Data

[63] Continuation-in-part of Ser. No. 769,716, Oct. 2, 1991.

[51] Int. Cl.[5] .................. G01B 5/255; G01B 7/315
[52] U.S. Cl. ........................ 33/203.12; 33/203.13; 33/203.18
[58] Field of Search ................... 33/203.12, 203.21

[56] References Cited

U.S. PATENT DOCUMENTS

| | | |
|---|---|---|
| 3,187,440 | 6/1965 | Merrill et al. ............... 33/203.13 |
| 3,494,045 | 2/1970 | Merrill ...................... 33/203.12 |
| 3,793,734 | 2/1974 | Merrill ...................... 33/203.12 |
| 3,875,672 | 4/1975 | Castoe ....................... 33/203.12 |
| 4,443,951 | 4/1984 | Elsässer et al. ............. 33/203.13 |
| 4,567,667 | 2/1986 | Minagawa et al. ............. 33/203.12 |
| 4,576,044 | 3/1986 | Boni . | |
| 4,631,832 | 12/1986 | Schrammen et al. ........... 33/203.14 |
| 5,014,227 | 5/1991 | Kling et al. . | |
| 5,088,320 | 2/1992 | Fukuda et al. . | |

FOREIGN PATENT DOCUMENTS

0112206 6/1984 Japan .

Primary Examiner—William A. Cuchlinski, Jr.
Assistant Examiner—C. W. Fulton
Attorney, Agent, or Firm—Reising, Ethington, Barnard, Perry & Milton

[57] ABSTRACT

Method and apparatus are disclosed for determining the caster angle and the steering angle inclination of a steerable wheel on a vehicle. The wheel is supported on a member which has freedom of motion along the fore-and-aft and transverse axes of the vehicle and freedom of rotation about a mutually perpendicular rotation axis. When the wheel is turned both right and left to a given steering angle from the straight ahead direction, a rotary encoder measures the steering angle and an X-axis encoder and a Y-axis encoder measure the linear displacement along the transverse and fore-and-aft axes, respectively. These measurement values, along with known values of axle height and wheel camber angle, as well as the automobile manufacturer's design dimensions of caster offset and steering axis inclination offset, are supplied to a computer which calculates the caster angle or the steering angle inclination, or both, in accordance with a functional relationship of the measured values and known values.

12 Claims, 8 Drawing Sheets

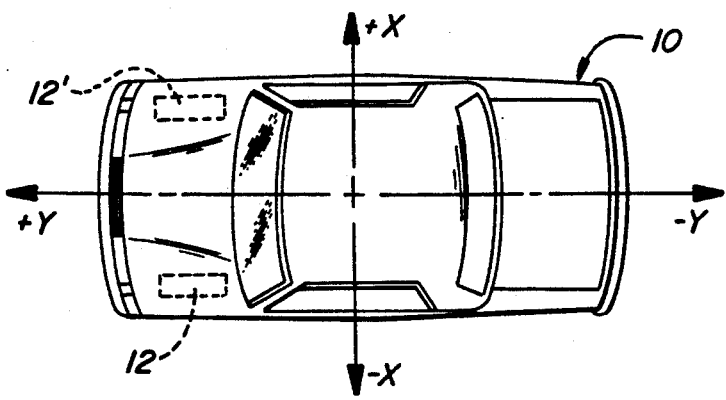
FIG-1
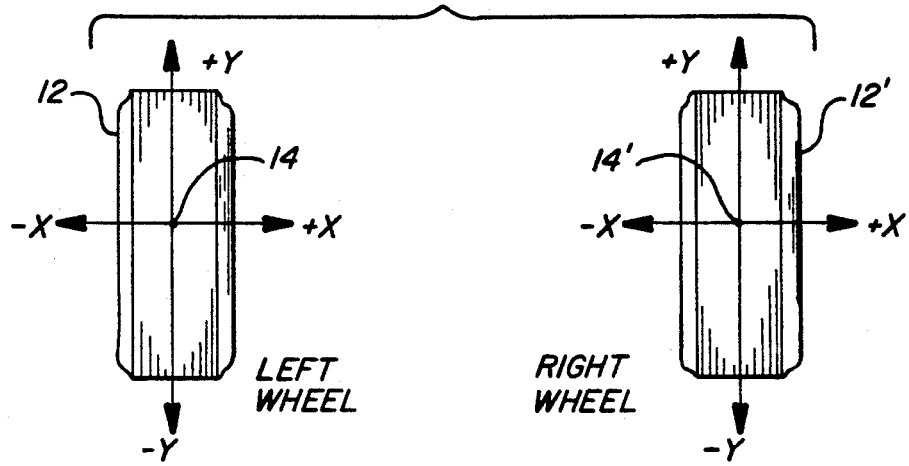
FIG-2A
FIG-2B
| GEOMETRY CAUSING THE EFFECT | | LEFT WHEEL | | RIGHT WHEEL | |
|---|---|---|---|---|---|
| | | STEER RIGHT | STEER LEFT | STEER RIGHT | STEER LEFT |
| POSITIVE CASTER TRAIL  $+R_{MC}$ | X | − | + | − | + |
| | Y | + | + | + | + |
| NEGATIVE CASTER TRAIL  $-R_{MC}$ | X | + | − | + | − |
| | Y | − | − | − | − |
| SAI W/CAMBER, POSITIVE OFFSET | X | + | + | − | − |
| | Y | + | − | − | + |
| SAI W/CAMBER, NEGATIVE OFFSET | X | − | − | + | + |
| | Y | − | + | + | − |

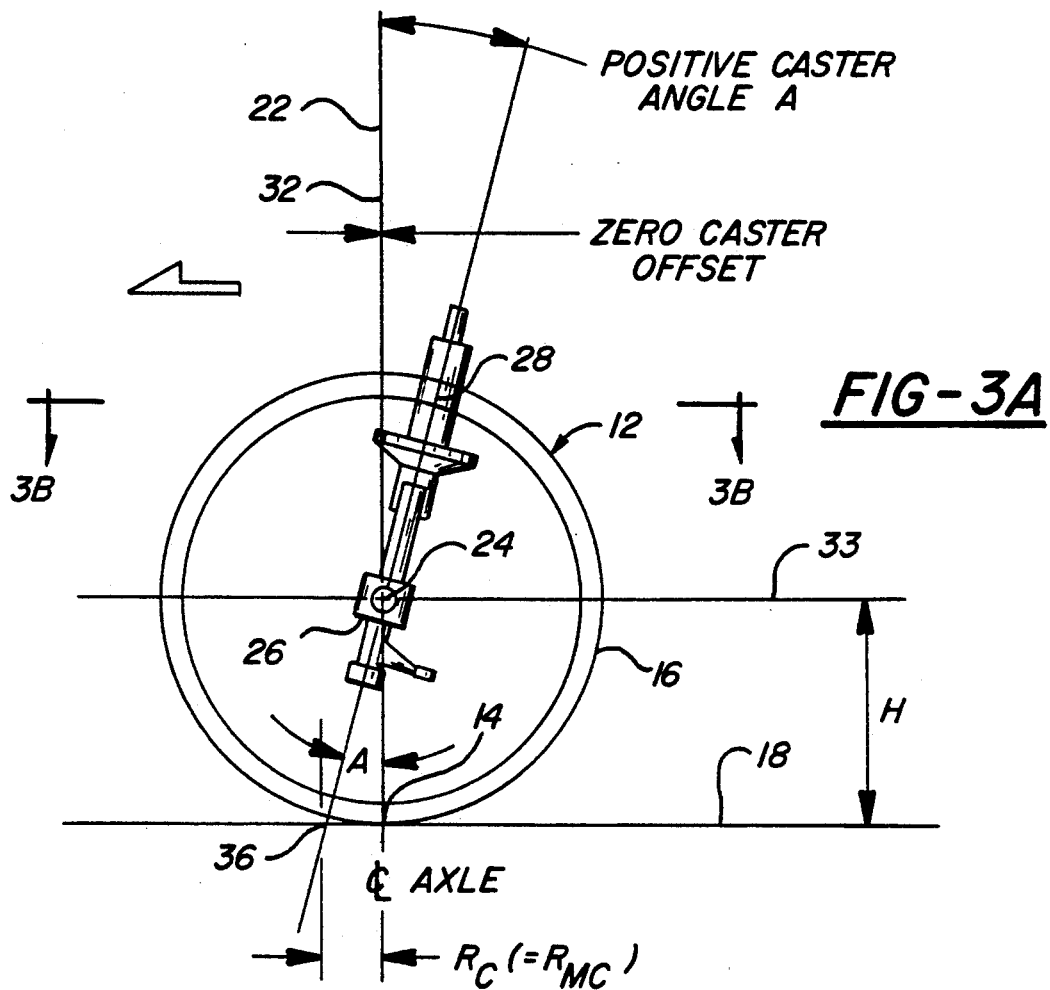
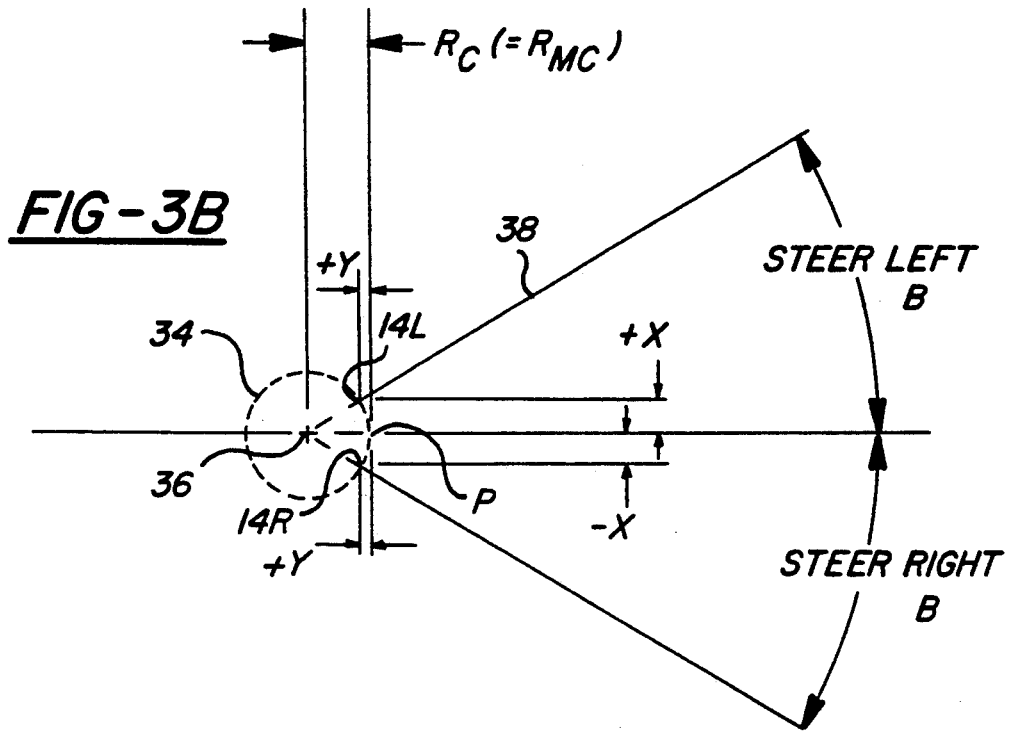

METHOD AND APPARATUS FOR DETERMINING CASTER AND STEERING AXIS INCLINATION ANGLES

CROSS REFERENCE TO RELATED APPLICATION

This is a continuation-in-part of Ser. No. 769,716, filed Oct. 2, 1991.

FIELD OF THE INVENTION

This invention relates to the alignment of the steerable wheels of an automotive vehicle; more particularly, it relates to the determination of the caster angle and the steering axis inclination angle.

BACKGROUND OF THE INVENTION

It is known that the proper alignment of the steerable wheel of a vehicle plays an important part in the steering performance, road handling characteristics and tire wear. Wheel alignment is designed specifically to meet the requirements of a given vehicle and thus a manufacturer has different alignment specifications for each different model of vehicle. In the manufacture of a vehicle, great care is taken to establish the steerable wheel alignment according to design specifications and such alignment should be maintained during the life of the vehicle. However, certain aspects of alignment are difficult to measure or otherwise determine from the vehicle itself.

As is well understood by those skilled in the art, the front wheels of a car are typically supported in a geometry that is especially designed to enhance certain attributes of car performance such as road handling and tire wear. Included in this geometry of the front wheels are the features known as camber, caster, toe and steering axis inclination (SAI). These features all have values which may be expressed in terms of an angular quantity. The car manufacturer specifies a design or nominal value for each of such features and, in some cars, the value may be zero for a given feature, and may be different for the left and right wheels of the car. The values of these features for a given car should conform to those specified by the manufacturer. Accordingly, as a matter of quality control the manufacturer typically measures or otherwise checks these features. In some cases it may be part of an audit procedure of the manufacturer and in some cases adjustments are made as required.

This invention is addressed to the determination of the caster angle; and in connection with that, the camber angle and SAI angle are also considered. The caster angle is the forward or rearward tilt of the steering axis. The steering axis is an imaginary line drawn through the center of the kingpin or through the centers of the upper and lower ball joints or other such pivot members. The camber angle is the inward or outward tilt of the wheel relative to a vertical plane. The SAI angle is the angle formed between the steering axis and a vertical line, as viewed from the front of the vehicle. These aspects of the geometry of the front wheel alignment result in a tendency of a point of tire contact with the ground (road) to change in response to steering rightward or leftward from the straight ahead direction. Movement of the point of tire contact with the ground due to the wheel being steered rightward or leftward is also affected by the distance between the center of the wheel and the intersection of the steering axis with the horizontal plane containing the wheel's rotational axis. The component of this distance along the automobile's fore-and-aft axis is known as caster offset (CO). The component of this distance along the automobile's perpendicular or transverse axis is known as the steering axis inclination offset (SAI offset).

The camber angle and the toe angle are readily measurable on the vehicle and it is common practice to use camber and toe measuring apparatus in the vehicle factory as well as for service and maintenance during the life of the vehicle. These values are measured between the plane of the wheel and a horizontal or vertical plane with the vehicle on a horizontal surface and such planes are readily accessed on the vehicle for measurement. However, the caster angle is by definition the tilt of the steering axis of the wheel in a vertical plane and it cannot be readily accessed on the vehicle because it is an imaginary line drawn between two points such as the upper and lower ball joints. Similarly, the SAI angle is the angle of an imaginary line, the steering axis, relative to the vertical. The determination of these angles presents a special problem and there has been a longstanding need for a method for accurate determination for quality control and manufacture of the vehicle as well as subsequent maintenance.

One prior art method and apparatus for checking alignment for a pair of spaced vehicle wheels is shown and described in Merrill et al. U.S. Pat No. 3,187,440 granted Jun. 8, 1965. The method and apparatus of that patent utilize a pair of spaced wheel engaging rolls which are movable relative to each other along their axes in response to axial wheel forces imposed thereon. The total and differential axial movement of the rolls due to rotation of the vehicle wheel is used to cause pivotal movement of the rolls so as to align their axes with the wheel axis. This new position of the rolls relative to their initial position is measured and can be used to determine camber angle. Camber angle is measured in this way at various steer positions of the wheels. The angle through which the wheel is steered and the change in camber at the various steer positions is then used to determine caster angle and kingpin angle.

Another prior art method and apparatus for determining caster trail of a steerable wheel on a vehicle is described in Merrill U.S. Pat. No. 3,793,734 granted Feb. 26, 1974. The apparatus of this patent includes a pair of fore-and-aft rollers which support the steerable wheel at two points of reference. The swinging of the wheel away from a straight ahead direction is said to cause a force to be applied to the rollers parallel to the longitudinal axis thereof. According to the patent, the force distributed along each roller is measured and compared, one with the other, to compute static, kinetic and pneumatic caster trail. In one embodiment, the patent describes the measurement of the reference points along the transverse axis of the vehicle with the wheel steered right through a given steering angle and also with the wheel steered left through the same angle. From this information, the caster trail of the wheel is calculated.

A general object of this invention is to provide an improved method and apparatus for determining the caster angle and the SAI angle of a steerable wheel on a vehicle and to overcome certain disadvantages of the prior art.

SUMMARY OF THE INVENTION

In accordance with this invention, a method and apparatus are provided which accurately determine the caster angle or SAI angle or both of a steerable wheel on a vehicle. This is accomplished by steering the wheel to a given steering angle in both the rightward and leftward direction and measuring the displacement of a point on the wheel along the fore-and-aft axis or the transverse axis, or both, in the horizontal plane. Using these measured values, the measured camber angle value, the axle height and the automobile design dimensions of caster offset and SAI offset, the value of the caster angle and the SAI angle are calculated with a high degree of accuracy.

Further, in accordance with the invention, the steerable wheel of the vehicle is supported on a support member which has freedom of motion along the fore-and-aft and transverse axes of the vehicle as well as rotary motion about a perpendicular axis. The wheel is turned right and left from the straight ahead direction through a measured steering angle. The linear displacement of the support member is measured along at least one axis of the fore-and-aft axis and transverse axis for each steering position. The caster angle is calculated using the measured displacements, the caster offset, the steering angle and the axle height. Preferably, the motion is measured by an encoder on each axis of the support member. The measured values and the measured camber angle are preferably supplied along with the known values of caster offset, SAI offset, and axle height to a computer for calculation of the caster angle, the SAI angle and, if desired, the caster trail.

A complete understanding of this invention may be obtained from the detailed description which follows taken with the accompanying drawings.

DESCRIPTION OF THE DRAWINGS

FIG. 1 is a plan view of a vehicle showing the steerable wheels under consideration;

FIG. 2A is a plan view showing a pair of steerable wheels;

FIG. 2B is a chart showing effects of certain steerable wheel geometry;

FIG. 3A is an elevational view of a steerable wheel having zero caster offset;

FIG. 3B is a graphical representation of displacement of a reference point on the wheel of FIG. 3A due to caster angle;

BEST MODE FOR CARRYING OUT THE INVENTION

Figure 4A:
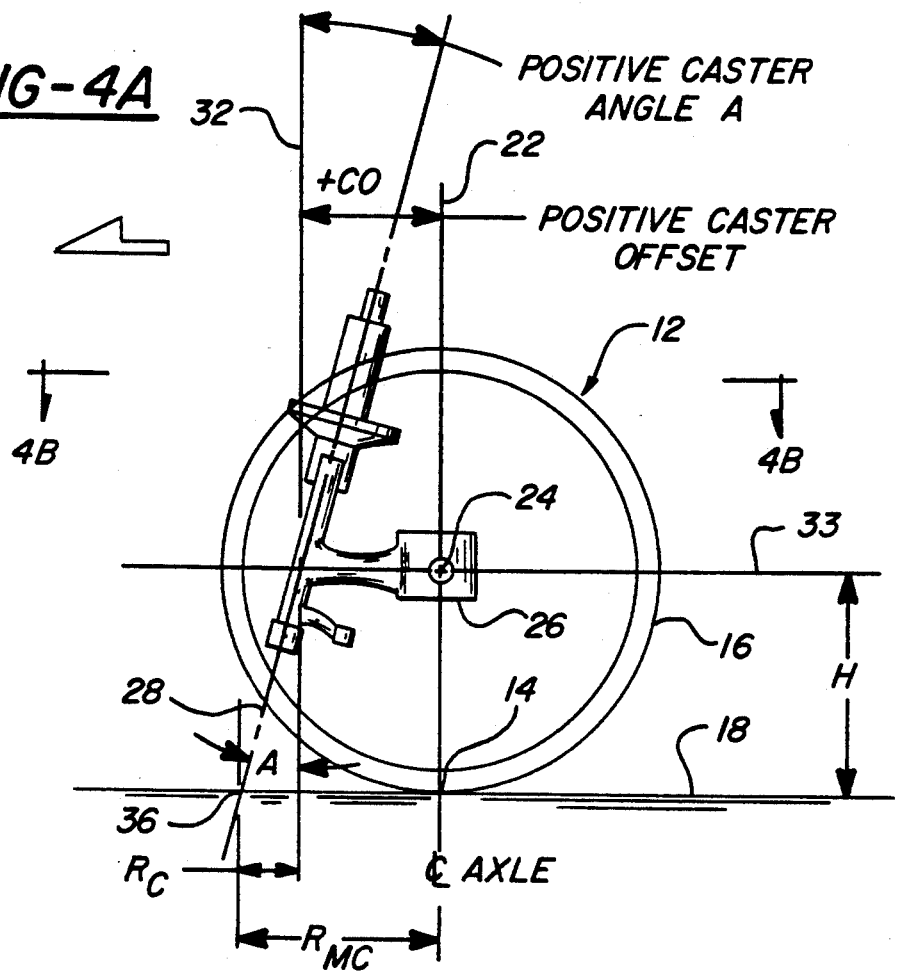
FIG. 4A is an elevational view of a steerable wheel having a positive, non-zero caster offset.

Referring now to the drawings, there is shown an illustrative embodiment of the invention in a method and apparatus for determining the caster angle and the SAI angle of a steerable wheel on an automotive vehicle, such as a conventional passenger car. It will be appreciated as the description proceeds that the invention may be implemented in different ways and may be utilized for other wheeled vehicles.

The method and apparatus for carrying out the invention will now be described with reference to the illustrative embodiment. First, it will be helpful to consider certain features of the steering geometry of a conventional passenger car.

FIG. 1 depicts a typical passenger car 10 having a longitudinal or fore-and-aft axis Y—Y along the center line of the car and a lateral or transverse axis X—X which is orthogonally related to the Y—Y axis and intersects it at any arbitrary point. The car 10, as is conventional, is provided with a pair of rear wheels, not shown, and a pair of front wheels 12 and 12', shown in phantom, which are the dirigible or steerable wheels of the car. Both front wheels are provided with the same suspension and steering apparatus and in the description that follows, the left front wheel 12 will be taken as the example for explanation of the invention.

As discussed above, this invention is addressed to the determination of the caster angle and the SAI angle. The geometry of the front wheel alignment, including the caster, SAI and camber angles, result in a tendency of a point of tire contact with the ground (road) to change in response to steering rightward or leftward from the straight ahead direction. This change in the point of contact will be described further with reference to FIGS. 2A and 2B.

In FIG. 2A, the two front wheels 12 and 12' are shown looking down on the road with respective contact points 14 and 14' which represent the point of contact of the wheel (tire) treads with the surface of the road and the wheels in the straight ahead direction. When the wheels are steered away from the straight ahead direction, there is a tendency for the contact points to move, depending upon the direction of steering. This movement of contact points 14 and 14' occurs because the geometry of each wheel's steering axis due to caster, caster offset, camber, SAI, and SAI offset results in the intersection of that steering axis with the road surface (i.e., the steering axis intersection point) being spaced from the contact point associated with that wheel.

The direction of movement of the contact point from the reference position is represented in the chart of FIG. 2B. In this chart, the first column indicates the geometry feature under consideration, the next column indicates the X and Y-axis for each feature. The next two columns relate to the left wheel and show, by plus or minus signs, the direction of movement of the contact point along the respective axis of FIG. 2, when the left wheel is steered right and when it is steered left. The next two columns show the same information for the right wheel. For example, when the combination of the caster angle and caster offset results in a positive caster trail, the point of contact 14 of the left wheel tends to move in the negative direction on the X-axis when the wheel steered rightward and it tends to move in the positive direction on the X-axis when it is steered leftward. The same is true of the right wheel. It is noted that the effects are different for a negative caster trail in that the direction of movement is reversed along each axis for both rightward steering and leftward steering for both wheels. The SAI angle with camber has the effect of causing movement of the point of contact for the left wheel in opposite directions from that of the right wheel for both directions of steering. The direction of movement along the X and Y-axes also depends on whether the combination of camber, SAI, and SAI offset results in the intersection of the steering axis with the road surface (the steering axis intersection point) being to the right or left of contact point 14; that is, whether the offset of the steering axis intersection point from the contact point is positive or negative. The steering axis intersection point is considered to have a positive offset or value if it is located inside of contact point 14 (i.e., between contact points 14 and 14′). It has a negative offset or value if it is located outside of contact point 14 (i.e., in the −x direction for wheel 12, as shown in FIG. 2A). As FIG. 2B indicates, the direction of movement along the X and Y-axes due to SAI with camber will be opposite for wheels exhibiting negative offset than for wheels exhibiting positive offset.

FIGS. 3A through 5B depict the influence of caster angle and caster offset, in a quantitive manner, on the displacement of the point of contact for the left wheel when it is steered leftward and rightward from the straight ahead direction. Left wheel 12, as shown in FIGS. 3A, 4A and 5A, is viewed looking from the outer side of the wheel, which has been drawn transparent for the purpose of illustration. The tread 16 of the wheel is resting on the roadway surface 18 and the contact point 14 between the tread and the road surface is considered to be on the centerline 22 of the axle. The wheel is rotatable about the axis 24 of the wheel axle which is supported on a steering knuckle 26. An upper pivot joint supports the upper end of the steering knuckle and a lower pivot joint supports the lower end. The steering axis 28 is a line extending between the upper and lower pivot joints which may also be considered as the kingpin axis. The steering axis 28 is inclined at the caster angle A. The caster angle is located in the vertical plane parallel to the fore-and-aft axis Y—Y and is measured relative to a vertical line 32 which extends through the intersection of steering axis 28 with a horizontal line 33 that extends through axis 24 in a direction parallel to the Y—Y axis. Horizontal line 33 is spaced from the road surface 18 by the height H of axle 24. Caster offset CO is the distance along horizontal line 33 from axle axis 24 to steering axis 28. Caster offset is considered to have a positive value when steering axis 28 intersects horizontal line 33 forward (+y direction) of axle axis 24 as shown in FIG. 4A. Accordingly, caster offset is considered to have a negative value when steering axis 28 intersects horizontal line 33 rearward (−y direction) of axle axis 24 as shown in FIG. 5A. As FIG. 3A indicates, the caster offset is zero when vertical line 32 is collinear with the axle centerline 22.

Figure 4B:
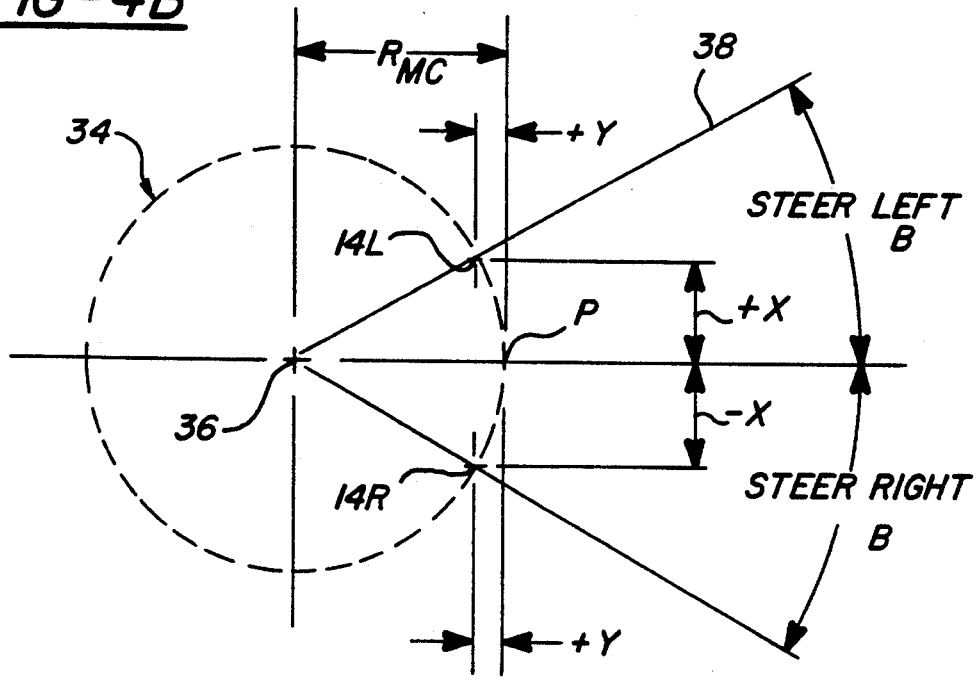
FIG. 4B is a graphical representation of displacement of a reference point on the wheel of FIG. 4A due to caster angle.
Figure 5A:
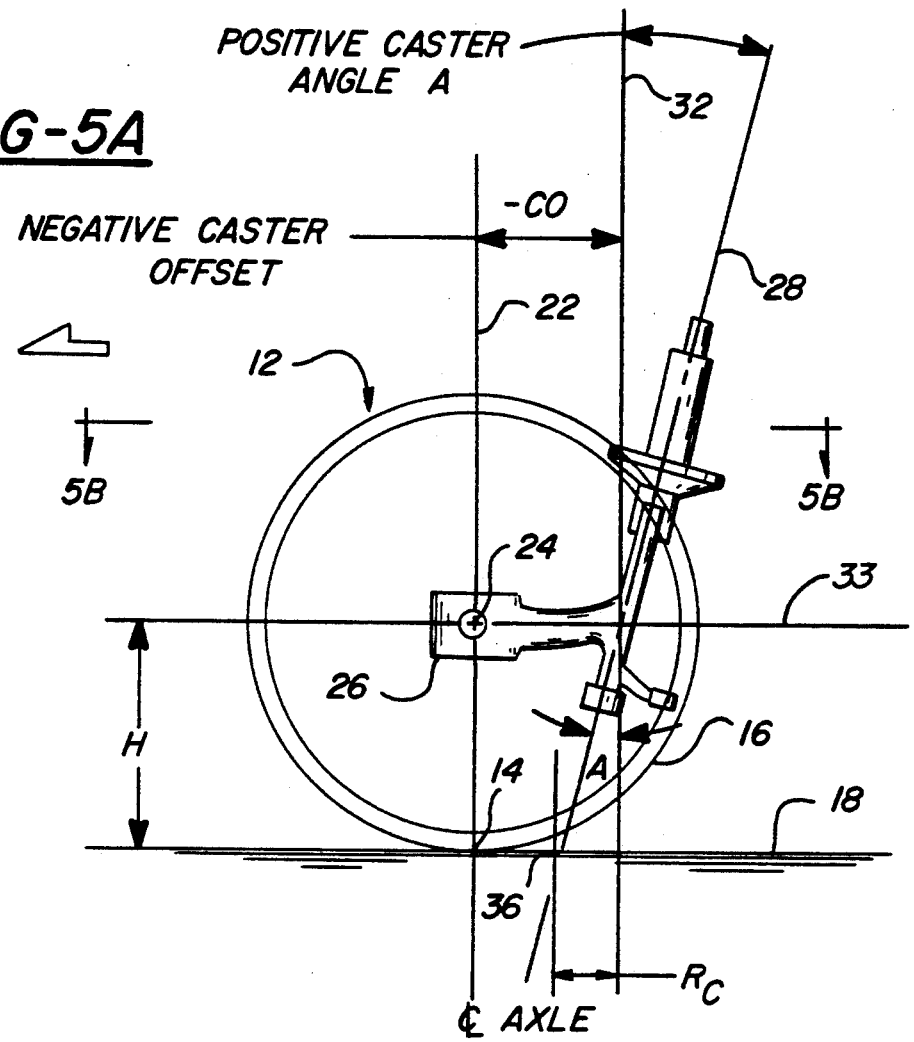
FIG. 5A is an elevational view of a steerable wheel having a negative caster offset.
Figure 5B:
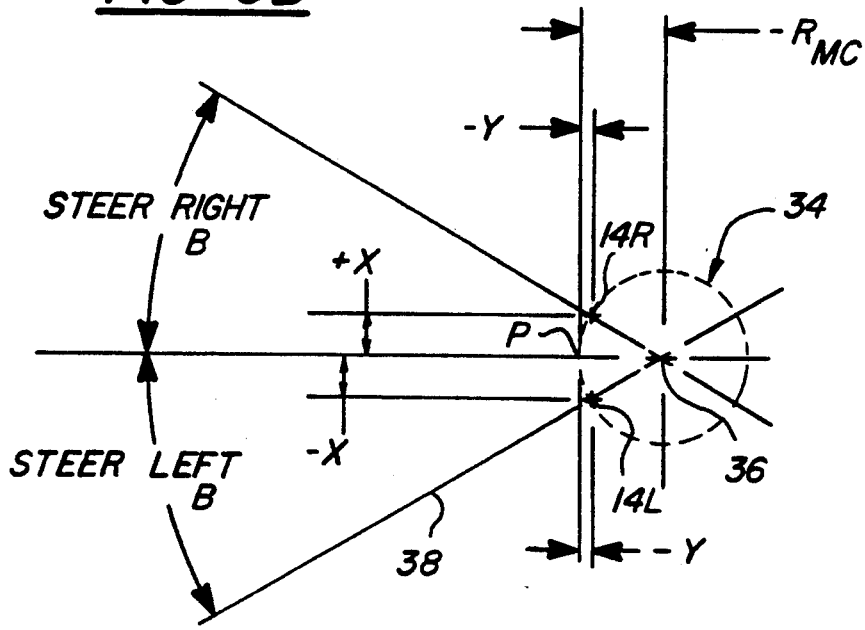
FIG. 5B is a graphical representation of displacement of a reference point on the wheel of FIG. 5A due to caster angle.

The description of the displacement of the contact point 14, due to caster, when the wheel 12 is steered will be given on the assumption that the SAI offset and the combined SAI and camber angle are zero. When the wheel 12 is steered rightward or leftward from the straight ahead position it rotates about the steering axis 28. Accordingly, the contact point 14 is displaced from its reference position P, provided that the caster angle and caster offset are not zero. This is illustrated in FIGS. 3B, 4B, and 5B which diagrammatically show the trace 34 of the contact point 14 on the road 18 as it is displaced by steering of the wheel rightward and leftward from the straight ahead direction. The trace 34 describes a circular arc about the steering axis intersection point 36. The intersection point 36 and the contact point 14 are projected from FIGS. 3A, 4A and 5A to FIGS. 3B, 4B and 5B, respectively, and are separated by a distance $R_{MC}$ on the surface 18. Distance $R_{MC}$ is called the caster trail and is equal to the radius of the circular trace 34. As discussed below, $R_{MC}$ can be geometrically calculated using measured values of the movement of contact point 14 along the automobile's transverse and fore-and-aft axes due to wheel 12 being turned left and right through a known steering angle B, which is preferably in the range of 7 to 15 degrees. Then, using the calculated value of caster trail and the automobile manufacturer's design value of caster offset (CO), the portion $R_C$ of the caster trail $R_{MC}$ due to the caster angle A can be calculated and used to determine the caster angle A.

When the wheel 12 is steered to the left through the steering angle B, the central plane of the wheel is at the position of the radial line 38 as shown in FIGS. 3B, 4B and 5B. At this steering angle, the contact point 14 is displaced to a point 14L. If the caster trail is positive (i.e., if contact point 14 is located forward of the steering axis intersection point 36 as shown in FIGS. 3A and 4A), point 14L is located along the positive direction of the X-axis by a distance +x and is located along the Y-axis in the positive direction by a distance +y. If the caster trail is negative as shown in FIG. 5A, the displacements along the X and Y-axes are reversed. When the wheel is steered to the right to the steering angle B, the contact point 14 is displaced to point 14R. If the caster trail is positive as shown in FIGS. 3A and 4A, point 14R has an X-axis displacement of −x and a Y-axis displacement of +y. If the caster trail is negative as shown in FIG. 5A, the displacements along the X and Y-axes are again reversed. These displacements for both positive and negative caster trail are tabulated in FIG. 2B and, as that figure indicates, are the same for both left wheel 12 and right wheel 12′.

Figure 6A:
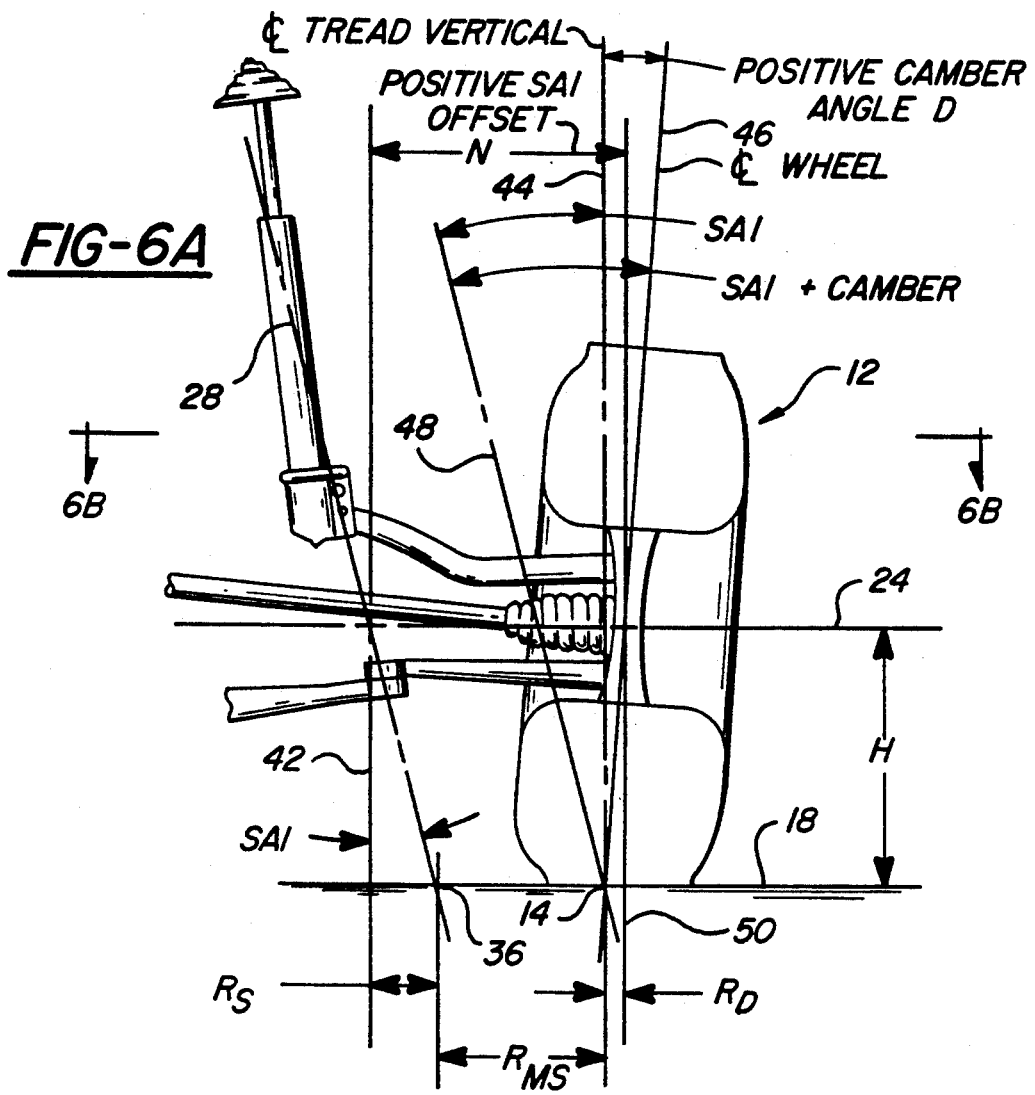
FIG. 6A is a view of a steerable wheel showing SAI, camber angle, and a positive SAI offset resulting in the steering axis intersecting the road surface at a point inside of the tread centerline.

The influence of the SAI angle and the camber angle of the front wheel 12 on the displacement of the contact point 14 between the tread and the road 18 is illustrated in FIGS. 6A through 7B. FIGS. 6A and 7A are views of the left front wheel 12 looking toward the rear from the front of the car. FIG. 6A is shown with positive SAI offset such that the steering axis intersection point 36 is inside of contact point 14 (positive offset). FIG. 7A is shown with a small positive SAI offset such that steering axis intersection point 36 is outside of contact point 14 (negative offset). As will be understood by those skilled in the art, a negative SAI offset would also result in a negative offset of intersection point 36.

Figure 6B:
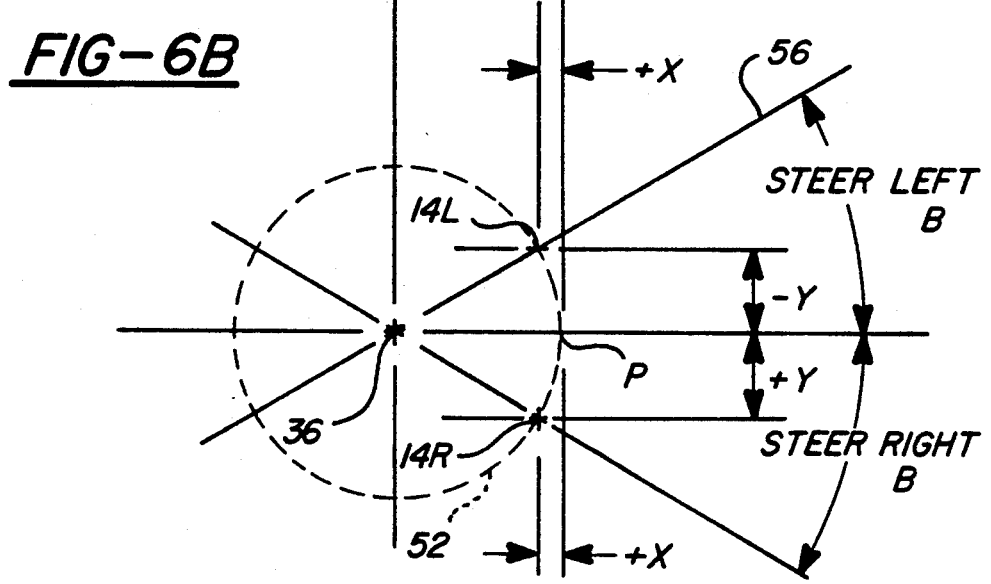
FIG. 6B is a graphical representation of displacement of a reference point on the wheel of FIG. 6A due to SAI, the camber angle, and SAI offset.
Figure 7A:
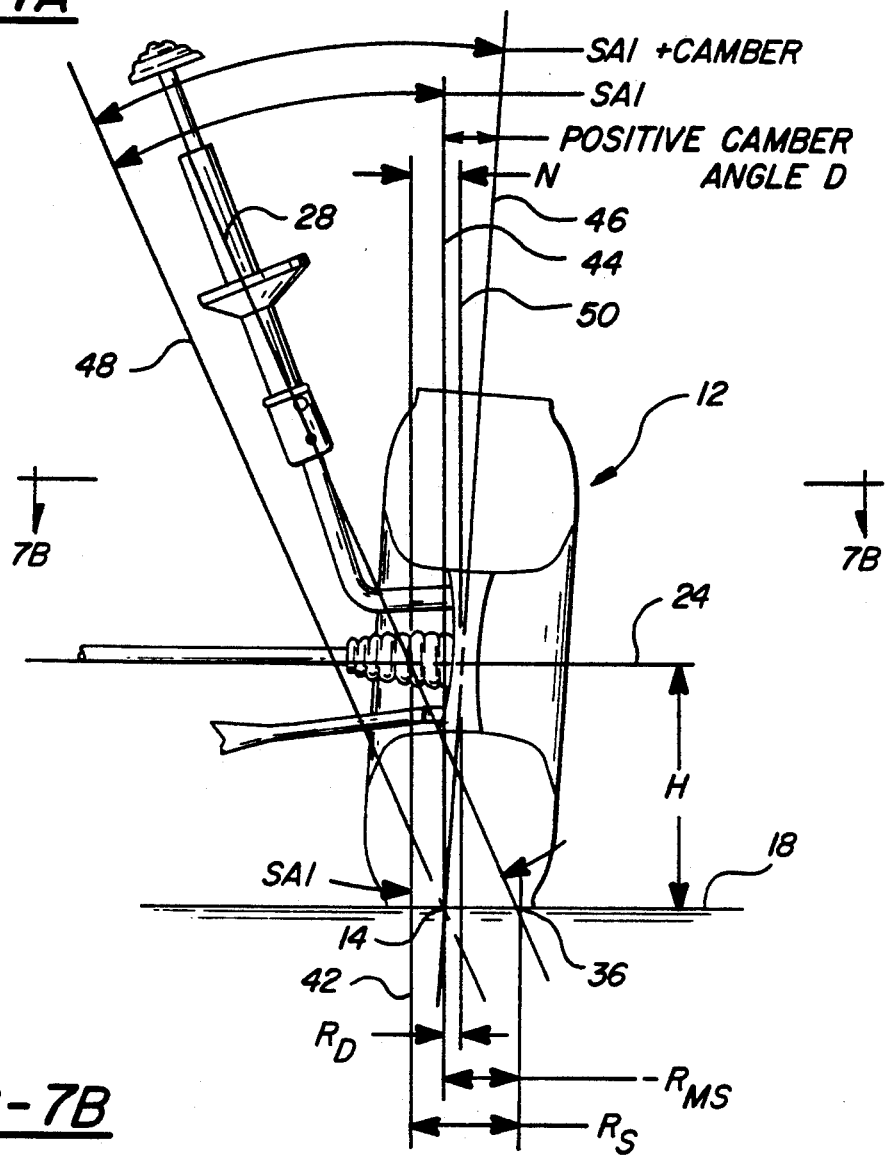
FIG. 7A is a view of a steerable wheel showing SAI, camber angle, and a small positive SAI offset resulting in the steering axis intersecting the road surface at a point outside of the tread centerline.
Figure 7B:
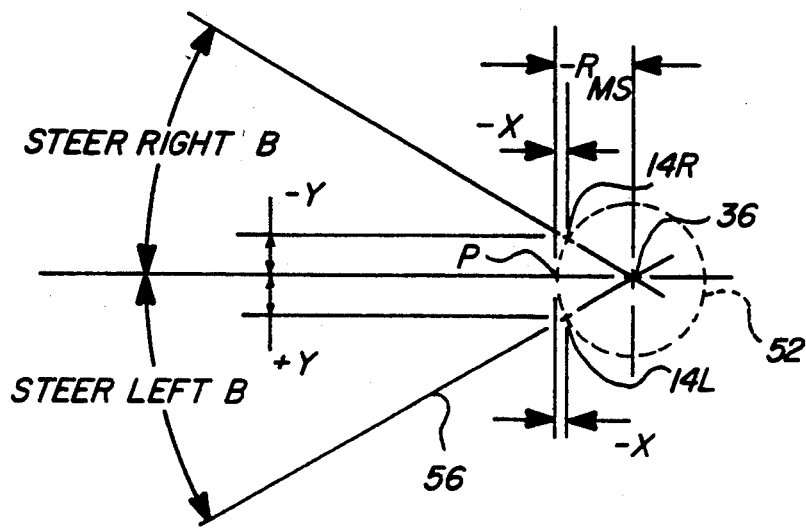
FIG. 7B is a graphical representation of displacement of a reference point on the wheel of FIG. 7A due to SAI, the camber angle, and SAI offset.

The description of the displacement of the contact point 14 will be given with the assumption that the caster angle and caster offset of the wheel are zero. In FIGS. 6A and 7A, the steering axis 28 and the axle axis 24 are shown in a vertical plane perpendicular to the fore-and-aft axis Y—Y with the wheel 12 in the straight ahead position. The SAI angle is the angle between the steering axis 28 and a vertical line 42 extending through the point of intersection between steering axis 28 and axle axis 24. Camber is the angle between a vertical line 44 extending through contact point 14 and the center line 46 of wheel 12 which is shown in FIGS. 6A and 7A as tilted outwardly to provide a positive camber angle D. The combined camber and SAI angle can be shown as an angle which extends between the center line 46 of wheel 12 and a line 48 which extends parallel to steering axis 28 and intersects contact point 14. SAI offset, designated as N, is the distance along axle axis 24 from steering axis 28 to the center line 46 of wheel 12. As shown in FIGS. 6A and 7A, SAI offset N is therefore the distance between vertical line 42 and another vertical line 50 extending through the intersection of center line 46 with axle axis 24. When the wheel is steered rightward or leftward from the straight ahead position it rotates about the steering axis 28. Accordingly, the contact point 14 is displaced from its reference position P. This is shown in FIGS. 6B and 7B which show the trace 52 of the contact point 14 on the road 18 as it is displaced by steering of the wheel 12. The trace 52 describes a circular arc about the steering axis intersection point 36. The intersection point 36 and the contact point 14 are projected from FIGS. 6A and 7A to FIGS. 6B and 7B, respectively, and are separated by a distance $R_{MS}$ on the road surface 18 which is equal to the radius of the circular trace 52. As discussed below, $R_{MS}$ can be geometrically calculated using measured values of the movement of contact point 14 along the automobile's transverse and fore-and-aft axes due to wheel 12 being turned left and right through a known angle. Then, using the calculated distance $R_{MS}$, the automobile manufacturer's design value of SAI offset, the known camber angle, and the measured or otherwise known value of axle height, the distance $R_S$ along the transverse axis due to the SAI angle can be calculated and used to determine the SAI angle.

When the wheel 12 is steered to the left through a steering angle B, the central plane of the wheel is at the position of the radial line 56. At this steering angle, the contact point 14 is displaced to a point 14L. If intersection point 36 has a positive offset from contact point 14, as shown in FIGS. 6A and 6B, point 14L is displaced along the X-axis from contact point 14 by a distance of $+x$ and along the Y-axis by a distance of $-y$. If intersection point 36 has a negative offset as shown in FIG. 7A, the displacements along the X and Y-axes are reversed. When the wheel is steered to the right to the steering angle B, contact point 14 is displaced to a point 14R. If intersection point 36 has a positive offset from contact point 14, point 14R is displaced along the X-axis from contact point 14 by a distance of $+x$ and along the Y-axis by a distance of $+y$. If intersection point 36 has a negative offset as shown in FIG. 7A, the displacements along the X and Y-axes are again reversed. As with caster trail, these displacements are tabulated in FIG. 2B for both the left and right wheel.

As discussed above, the caster angle cannot, as a practical matter, be measured directly. Similarly, the SAI angle is not measurable as a practical matter. On the other hand, the camber angle and the steering angle can be readily and accurately measured. The axle height can either be measured or obtained from the vehicle manufacturer and the caster offset and SAI-offset can be obtained or determined from the vehicle manufacturer's design data in a manner known to those skilled in the art.

Caster angle and caster offset in a steerable wheel combine to provide caster trail which has the effect of displacement of a contact point between the wheel tread and road surface in response to steering the wheel through a given angle when the SAI offset and combined SAI and camber angle are zero. Similarly, the combination of camber angle, SAI angle, and SAI offset in a steerable wheel has the effect of displacement of a contact point between the wheel tread and road surface in response to steering the wheel through a given angle, when no caster trail is present. The displacement effect due to caster angle and caster offset and the displacement effect due to SAI offset and the combined SAI and camber angle are cumulative; the total displacement of the contact point is equal to the algebraic sum of the displacement resulting from caster angle and caster offset and the displacement resulting from the SAI offset and combined SAI and camber angle. The total displacement of the contact point can be directly measured, as will be described below with reference to FIGS. 8 and 9. With known values of caster offset, camber, SAI offset and axle height and the measured values of contact point displacement for a known steering angle, the caster and SAI angles can be calculated.

Figure 8:
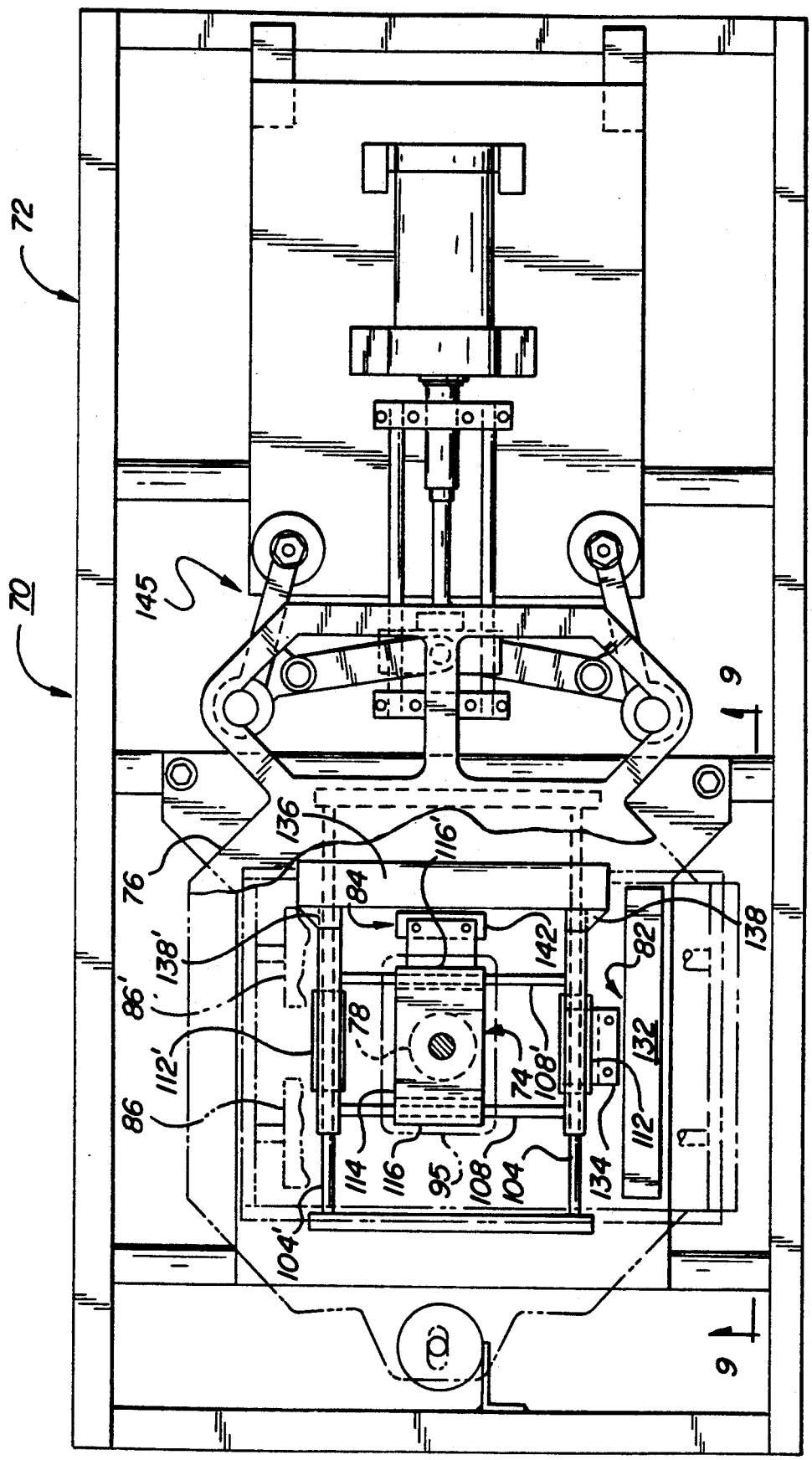
FIG. 8 is a plan view of the measuring apparatus.
Figure 9:
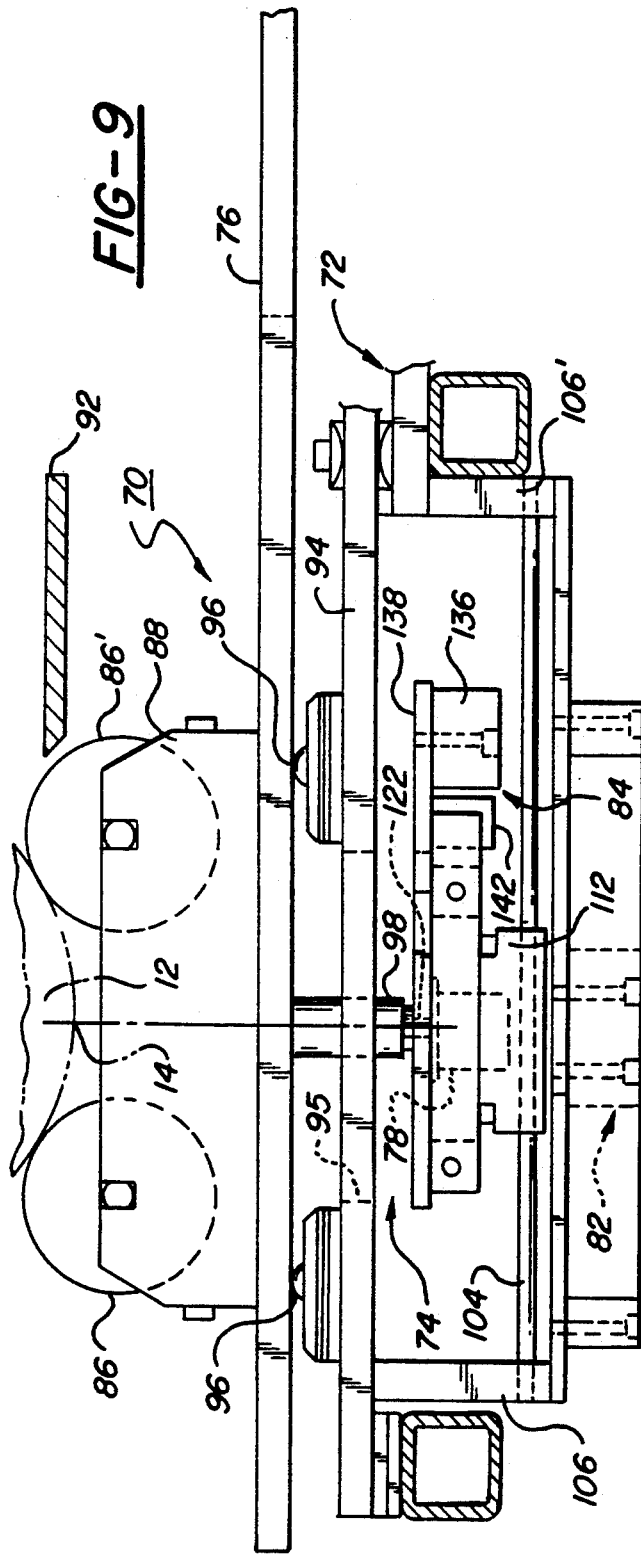
FIG. 9 is an elevation view of the measuring apparatus.
Figure 10:
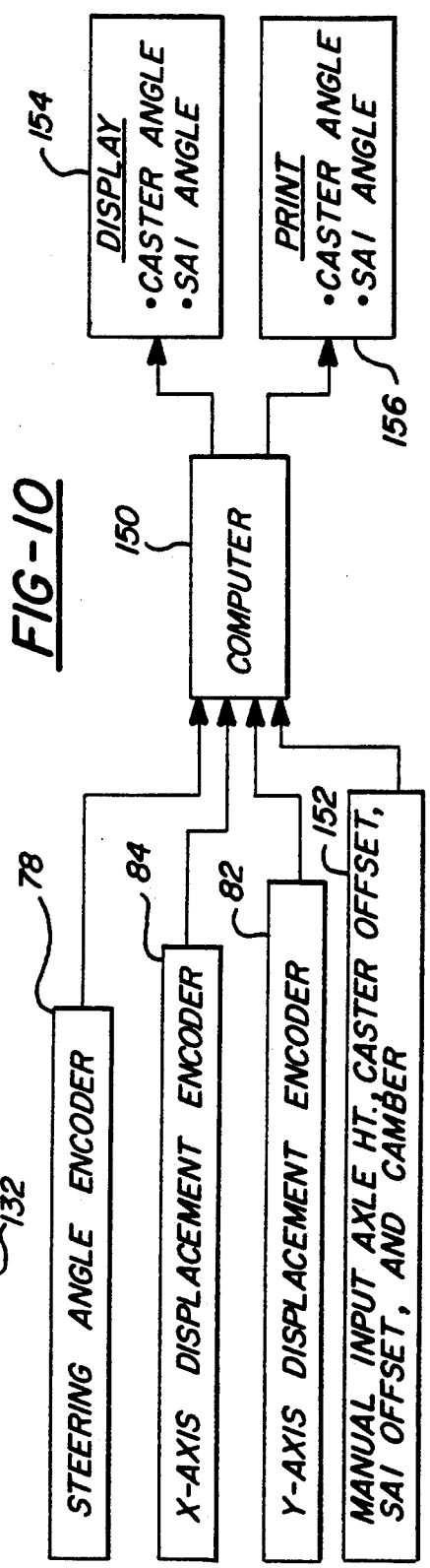
FIG. 10 is a block diagram of a computer for calculating the caster and SAI.

Before describing the method of calculation of the caster angle and the SAI angle, it will be helpful to consider the measuring apparatus of this invention which is illustrated in FIGS. 8, 9 and 10. The measuring apparatus is adapted to obtain measured values of both X-axis and Y-axis displacement of the contact point when the steerable wheel is steered right and steered left from the straight ahead position by a given steering angle. This displacement information for a known steering angle, taken with caster offset, camber angle, SAI offset, and axle height, enables calculation of the caster angle and SAI angle in accordance with this invention. The measurement of the X and Y-axis displacement is made with the steerable wheel on the vehicle and typically, measurements of the left wheel 12 and the right wheel 12' would be made at the same time.

The measurement apparatus as shown in FIGS. 8 and 9 comprises an X-Y table 70 for each of the steerable wheels 12 and 12'. The apparatus shown is that for the left front wheel 12 and it will be understood that the same apparatus would be provided for the right front wheel 12'. The X-Y table 70 comprises, in general, a fixed frame 72 with an X-Y carriage 74 movable on the frame and a floating plate 76 mounted on the carriage. The floating plate 76 is adapted to support the vehicle wheel 12 and accommodate the rotary and translational movement of the wheel when it is steered right or left from the straight ahead position. The X-Y table 70 is provided with a rotary encoder 78 coupled with the floating plate 76. It is also provided with a Y-axis encoder 82 and an X-axis encoder 84 coupled respectively with the X-Y carriage 74.

The X-Y table 70 will now be described in greater detail. The wheel 12 of the vehicle is supported on the X-Y table 70 by a pair of cylindrical rollers 86 and 86' which in turn are rotatably mounted on the floating plate 76 by a support frame 88. The support frame 88 is fixedly mounted on the plate 76. The vehicle is positioned with the wheel 12 on the rollers 86 and 86' by driving or otherwise rolling it on a track or treadway 92. The floating plate 76 is supported on the fixed frame 72 in a manner which will now be described.

The fixed frame 72 of the X-Y table 70 comprises a fixed plate 94 which carries a set of four spherical rollers 96 which support the floating plate 76 for rotational and translational motion. The floating plate 76 is rotatable around the axis of a pivot shaft 98 which is non-rotatably secured to the floating plate 76. The pivot shaft 98 is rotatable relative to the X-Y carriage 74. The fixed plate 94 is provided with an opening 95 through which the shaft 98 extends.

The X-Y carriage 74 is mounted for rectilinear motion along the Y—Y axis and along the orthogonally related X—X axis. For this purpose, a pair of longitudinal shafts 104 and 104' are fixedly mounted in end plates 106 and 106' which are supported by the fixed plate 94 attached to the frame 72. The shafts 104 and 104' extend parallel to the Y—Y axis and support a pair of transverse shafts 108 and 108' extending therebetween. Each of the transverse shafts 108 and 108' is supported at its opposite ends on the longitudinal shafts 104 and 104' by respective bearing blocks 112 and 112' which are freely movable along the Y—Y axis. A carriage plate 114 is supported on the transverse shafts 108 and 108' on a pair of bearing blocks 116 and 116' which are freely movable along the X—X axis. Thus, the carriage plate 114 has two degrees of freedom in the horizontal plane in that it is freely movable along the Y—Y axis and along the X—X axis. The carriage plate 114 carries the rotary encoder 78 which has its shaft coupled with shaft 98. Thus, the measurement apparatus is supported on the stationary frame 72 by the fixed plate 94. It detects all motion of the floating plate 76 relative to fixed plate 94. Rotary motion is measured by the rotary encoder 78, X-axis motion is measured by linear encoder 84 and Y-axis motion is measured by the linear encoder 82.

The floating plate 76 is coupled to a holding mechanism 145 which is adapted to immobilize the plate 76 relative to frame 70 in a reference position while a vehicle wheel is placed on and removed from the rollers 86 and 86' of the measuring apparatus. The mechanism 145 of the measuring apparatus is of known design and will not be described in detail. When the vehicle wheel 12 is placed on the rollers, the vehicle 10 is aligned by the treadway 92 so that the longitudinal axis Y—Y of the vehicle is parallel with the longitudinal axis Y—Y of the X-Y table 70. The steerable wheel 12 is steered in the straight ahead direction when it is placed on the rollers 86 and 86'. When the holding mechanism 145 is released, the floating plate 76 is freely movable from the reference position which corresponds to the straight ahead direction of the wheel 12.

In order to measure the angular displacement of the wheel 12, and hence the floating plate 76, from the reference or straight ahead direction, the angular displacement encoder 78 is provided. The encoder 78 is mounted in fixed position on the lower side of the carriage plate 114 and is translationally movable therewith. The input shaft 122 of the encoder is coupled with the pivot shaft 98 and hence rotates with the floating plate 76. The encoder 78 is of known design and generates a digital output signal which represents the magnitude and direction of displacement of the floating plate 76 from its reference position. When the steerable wheel on the vehicle is steered to the right to a steering angle B the encoder 78 generates a digital signal representative of that steering angle. Similarly, when the wheel is steered left to a steering angle B the encoder 78 generates a digital signal corresponding thereto.

The Y-axis encoder 82 is provided for measurement of the translational displacement of the floating plate 76 along the Y—Y axis. It comprises an optical scale member 132 and an optical reader 134, of known design. The scale member 132 is fixedly mounted on the frame 72 and the reader 134 is mounted on the bearing block 112 for movement therewith along the Y—Y axis. The linear optical encoder 82 produces a digital output signal which represents the magnitude and direction of displacement of the floating plate 76 away from its reference position along the Y—Y axis. The reference position is the position of the floating plate 76 with the steerable wheel 12 in the straight ahead direction.

The X-axis encoder 84 is preferably a linear optical encoder like encoder 82. It comprises an optical scale member 136 which is mounted by a pair of brackets 138 and 138' to the bearing blocks 112 at opposite ends of the cross shaft 108'. Thus, the scale member 136 is in fixed position on the X-axis. The encoder 84 also includes an Optical reader 142 which is mounted on the bearing block 116' for movement therewith along the X-axis. The optical encoder 84 generates a digital output signal which represents the magnitude and direction of displacement of the floating table 76 along the X—X axis from its reference position. The reference position is the position of the floating plate 76 with the steerable wheel 12 in the straight ahead direction. When the vehicle wheel 12 is supported on the X-Y table 70, steering of the wheel to the right or left of the straight ahead position causes the floating plate 76 to move in the horizontal plane. This movement is coupled to the X-Y carriage 74 via shaft 98. As a result, the displacements of the X-Y carriage 74 along the X and Y-axes are equal to those of shaft 98 and, therefore, of the point on the surface of wheel 12 directly above shaft 98. Preferably, shaft 98 is located centrally between the axes of rollers 86 and 86' and wheel 12 is positioned on rollers 86 and 86' such that contact point 14 is directly above shaft 98.

As previously discussed, when the wheel 12 is steered to the right or left, the contact point 14 on the wheel tread at the road is displaced according to the wheel alignment. The point 14 describes a circular arc in the plane of the road as a result of caster angle and caster offset when the SAI offset and combined camber and SAI angle are zero. It also describes a circular arc as a result of the SAI offset and combined camber and SAI angle when the caster trail is zero. However, when both angles are present the displacement effects are algebraically added together and the displacement of the point 14 describes an elliptical arc when the wheel is steered right and left. Thus, when the wheel 12 is positioned above the X-Y table and is steered away from the straight ahead position, any selected point on the floating plate 76 is displaced through an arc which is more or less elliptical depending upon the caster offset, SAI offset, and the degree of both caster angle and the combined camber and SAI angle.

The X-Y table 70 is adapted to measure the steering angle B and the X-axis component and the Y-axis component of the displacement of a point on the wheel directly above shaft 98, such as a contact point 14, when the wheel is steered away from the straight ahead position. In particular, the following values are measured by the X-Y table 70:

B = steering angle, right or left from straight ahead;
$X_{RM}$ = axis component displacement for a rightward steering angle;
$X_{LM}$ = X-axis component for a leftward steering angle;
$Y_{RM}$ = measured Y-axis component for a rightward steering angle;
$Y_{LM}$ = measured Y-axis component for a leftward steering angle.

As stated above, the camber angle D can be measured readily on the vehicle wheel, the axle height H can be either measured or obtained from the vehicle manufacturer for standard tires, and the caster offset and SAI offset can be obtained from the vehicle manufacturer. This information, taken with the measured values obtained from the X-Y table, is sufficient to permit calculation of the caster angle and the SAI angle in a manner which will be described subsequently.

Referring again to FIGS. 3A through 5B, the caster angle is calculated using the X-axis measurement values $X_{RM}$ and $X_{LM}$ as follows, (this calculation is made for the left wheel with positive caster trail and a positive offset of the steering axis intersection point): The measured value of the X-axis displacement for a left turn of steering angle B is the algebraic sum of the X-axis displacement due to the caster angle and caster offset and that due to the SAI offset and the combined camber and SAI angle. This is expressed as follows, using the algebraic signs from the chart of FIG. 2B for the given steering direction:

$$X_{LM} = X_C + X_S \quad (1)$$

The measured displacement along the X-axis for a right turn of steering angle B is the algebraic sum of the X-axis component due to caster angle and caster offset and the X-axis component due to the SAI offset and the combined camber and SAI angle. This is expressed as follows:

$$X_{RM} = -X_C + X_S \quad (2)$$

where;
$X_C$ equals the X-axis displacement due to caster angle and caster offset, and
$X_S$ equals X-axis displacement due to SAI offset and the combined camber and SAI angle.

Subtracting equation (2) from equation (1) and solving the difference for $X_C$ yields:

$$X_C = \frac{X_{LM} - X_{RM}}{2} \quad (3)$$

It should be noted here that if the left wheel 12 has a negative offset of the steering axis intersection point 36, rather than the positive offset assumed for equations (1) and (2), those equations will change only in that the X-axis component $X_S$ due to the SAI offset and the combined camber and SAI angle will have a negative value. Since the difference between equations (1) and (2) is taken in order to derive equation (3), the $X_S$ term will again drop out resulting in equation (3) remaining unchanged. Therefore, the positive or negative offset of the steering axis intersection point 36 does not effect calculation of the caster angle A.

By inspection of FIGS. 3B, 4B, and 5B, it can be seen that the sine of the steering angle B is equal to the ratio of $X_C$ to $R_{MC}$. This relationship taken with the value of $X_C$ as given in equation (3), yields:

$$R_{MC} = \frac{X_C}{\sin B} = \frac{X_{LM} - X_{RM}}{2 \sin B} \quad (4)$$

where:
$R_{MC}$ equals the radius of the caster trail arc 34 shown in FIGS. 3B, 4B and 5B.

As indicated in FIGS. 3A, 4A, and 5A, the caster trail $R_{MC}$ is composed of two components. One component is the caster offset CO which, as previously mentioned, is available from the vehicle manufacturer and can be taken as a known value. The other component is the portion of caster trail due to the caster angle A and is designated as $R_C$. Therefore, using the calculated value of caster trail $R_{MC}$ and the known value of caster offset CO, the portion $R_C$ of caster trail due to the caster angle can be calculated as follows:

$$R_C = R_{MC} - CO = \frac{X_{LM} - X_{RM}}{2 \sin B} - CO \quad (5)$$

As shown in FIG. 3A, if caster offset CO is zero, the caster trail does not include any caster offset component so that the amount of caster trail is simply a function of the caster angle A (i.e., $R_C = R_{MC}$).

By inspection of FIGS. 3A, 4A and 5A, it is seen that the caster angle A can be expressed as a function of the axle height H and the portion $R_C$ of the caster trail as follows:

$$\tan A = \frac{R_C}{H} \quad (6)$$

Equation (6) can be rewritten as:

$$A = \arctan \frac{R_C}{H} \quad (7)$$

By substituting the value of $R_C$ as given by equation (5) into equation (7) the desired expression for the caster angle A is obtained, as follows:

$$A = \arctan\left[\frac{1}{H}\left(\frac{X_{LM} - X_{RM}}{2 \sin B} - CO\right)\right] \quad (8)$$

Note that equation (8) expresses the value of the caster angle A in terms of the measured X-axis displacements $X_{RM}$, $X_{LM}$, the measured steering angle B, the available value of caster offset CO, and the measured, or otherwise known, value of axle height H.

Although positive caster trail has been assumed for the purpose of deriving equation (8), it should be appreciated that equation (8) also applies in the case of negative caster trail. This can be understood by reference to FIG. 2B. As that figure indicates, the directions of the X-axis displacements $X_C$ due to caster angle and caster offset are opposite where a negative caster trail exists than where a positive caster trail exists. Therefore, $X_{LM} - X_{RM}$ will produce a negative value resulting in the calculated caster trail $R_{MC}$ having a negative value, as can be seen by reference to equation (4). Referring again to equation (5), if the caster offset CO is positive or is negative with a magnitude less than the magnitude of the caster trail $R_{MC}$, $R_C$ will be negative which, as shown in equation (6), indicates that the caster angle A is negative. Conversely, if CO is negative and has a magnitude greater than $R_{MC}$, $R_C$ will be positive, indicating that the caster angle A is positive. Thus, equation (8) can be used to determine the caster angle regardless of whether the caster angle, caster offset, or resultant caster trail are positive or negative and, as previously discussed, whether the offset of the steering axis intersection point is positive or negative. Furthermore, since as shown in FIG. 2B the direction of displacements of the contact point due to caster angle and caster offset when steering through a right or left turn are the same for right wheel 12' as they are for left wheel 12, equation (8) can be used to calculate the caster angle of either of the steerable wheels.

The value of the caster angle A may also be calculated using the measured values of the Y-axis components of displacement for a given steering angle. This calculation is similar to that above and is as follows. Positive caster trail and a positive offset of the steering axis intersection point 36 are assumed. However, for the same reasons discussed above in connection with the X-axis components, the final equation for caster angle A does not change for a negative offset of the intersection point 36. The measured value of displacement along the Y-axis for steering angle B to the right, $Y_{RM}$, is equal to the algebraic sum of the Y-axis displacement due to caster angle and caster offset and the Y-axis displacement due to SAI offset and the combined camber and SAI angle. This can be expressed as follows, using the algebraic signs from the chart of FIG. 2B:

$$Y_{RM} = Y_C + Y_S \quad (9)$$

Similarly, the measured value of displacement along the Y-axis for steering angle B to the left, can be expressed as follows:

$$Y_{LM} = Y_C - Y_S \quad (10)$$

where:
$Y_C$ equals the Y-axis component of displacement due to caster angle and caster offset
$Y_S$ equals the Y-axis component of displacement due to SAI offset and the combined camber and SAI angle.

By adding equations (9) and (10) and solving for $Y_C$, the following expression is obtained:

$$Y_C = \frac{Y_{RM} + Y_{LM}}{2} \quad (11)$$

By inspection of FIGS. 3B, 4B, and 5B the following relation is evident:

$$\cos B = \frac{R_{MC} - Y_C}{R_{MC}} \quad (12)$$

Solving equation (12) for $R_{MC}$ using the value of $Y_C$ from equation (11) yields:

$$R_{MC} = \frac{Y_C}{1 - \cos B} = \frac{Y_{RM} + Y_{LM}}{2(1 - \cos B)} \quad (13)$$

The component $R_C$ of the caster trail $R_{MC}$ due to the caster angle can then be determined by subtracting the caster offset CO as follows:

$$R_C = R_{MC} - CO = \frac{Y_{RM} + Y_{LM}}{2(1 - \cos B)} - CO \quad (14)$$

Referring to FIGS. 3A, 4A, and 5A, the following relationship is apparent:

$$A = \arctan \frac{R_C}{H} \quad (15)$$

By substituting the value of $R_C$ from equation (14) into equation (15), the following expression for the caster angle A is obtained:

$$A = \arctan \left[ \frac{1}{H} \left( \frac{Y_{RM} + Y_{LM}}{2(1 - \cos B)} - CO \right) \right] \quad (16)$$

It is noted that equation (16) expresses the value of the caster angle A in terms of measured values of Y-axis displacement $Y_{RM}$, $Y_{LM}$, the measured value of steering angle B, the available value of caster offset CO, and the measured, or otherwise known, value of axle height H. As with equation (8), equation (16) enables calculation of the caster angle A regardless of whether the caster angle, caster offset, caster trail, or offset of the steering axis intersection point is positive or negative. Moreover, for the same reason discussed in connection with equation (8), equation (16) can be used to calculate the caster angle of either of the left and right steerable wheels.

As described above, the value of the caster angle A is calculated using the measured values of the X-axis components of displacement for a given steering angle as represented by equation (8). The value of the caster angle A can be calculated using the measured value of the Y-axis components of displacement and without use of the X-axis components, as represented by equation (16). Preferably, equation (8) is used to determine caster angle A, as the X-axis displacements are typically larger in magnitude than the Y-axis displacements for the same steering angle B. Alternatively, the average value of the two calculated values of caster angle may be used as the caster angle.

The SAI angle can be calculated using the X-axis measurement values $X_{RM}$ and $X_{LM}$. The measured value of the X-axis displacement for a right turn of steering angle B is the algebraic sum of the X-axis displacement due to the caster angle and caster offset and that due to the SAI offset and the combined camber and SAI angle. This is expressed as follows using the algebraic signs from the chart of FIG. 2B for a given steering direction (assume positive caster trail and positive offset of the steering axis intersection point 36):

$$X_{RM} = -X_C + X_S \quad (17)$$

The measured displacement along the X-axis for a left turn of a steering angle B is the algebraic sum of the X-axis component due to caster angle and caster offset and the X-axis component due to the SAI offset and combined SAI and camber angle. This is expressed as follows:

$$X_{LM} = X_C + X_S \quad (18)$$

Adding equations (17) and (18) and solving the resultant equation for $X_S$ yields:

$$X_S = \frac{X_{RM} + X_{LM}}{2} \quad (19)$$

It should be noted here that if left wheel 12 has a negative caster trail, rather than the positive caster trail assumed for equations (17) and (18), those equations will change only in that the X-axis component $X_C$ due to the caster angle and caster offset will change sign in each of those equations. Since equations (17) and (18) are added to derive equation (19), the $X_C$ term will again drop out resulting in equation (19) remaining unchanged. Therefore, the calculation of SAI angle is not affected by whether the caster trail is positive or negative.

By inspection of FIGS. 6B and 7B, the following relationship is apparent:

$$\cos B = \frac{R_{MS} - X_S}{R_{MS}} \quad (20)$$

where:
$R_{MS}$=the radius of the SAI/camber arc 52 shown in FIG. 6B.

Equation (20) can be expressed as:

$$R_{MS} = \frac{X_S}{1 - \cos B} = \frac{X_{RM} + X_{LM}}{2(1 - \cos B)} \quad (21)$$

As indicated in FIGS. 6A and 7A, the SAI offset N can be viewed as consisting of three components located along, or parallel to, the transverse axis. One of these components is a distance $R_D$ that is trigonometrically related to the camber angle D. The second of these components is the distance $R_{MS}$ calculated above from the X-axis displacements. The third component is a distance $R_S$ which is trigonometrically related to the SAI angle and, as described below, can be calculated using the known values of SAI offset, the measured value of camber, and the calculated distance $R_{MS}$. These three components can be algebraically added to give the SAI offset, as follows:

$$N = R_D + R_{MS} + R_S \quad (22)$$

Solving equation (22) for $R_S$ yields:

$$R_S = N - R_D - R_{MS} \quad (23)$$

With continued reference to FIGS. 6A and 7A, it is evident that the tangent of the measured camber angle D is equal to the ratio of the distance $R_D$ to the height H of the axle. Therefore:

$$R_D = H \tan D \quad (24)$$

Substituting equations (21) and (24) into equation (23) yields:

$$R_S = N - H \tan D - \frac{X_{RM} + X_{LM}}{2(1 - \cos B)} \quad (25)$$

By inspection of FIGS. 6A and 7A, it is apparent that:

$$\tan SAI = \frac{R_S}{H} \quad (26)$$

Rewriting equation (26) and substituting in the value of $R_S$ given by equation (25) yields:

$$SAI = \arctan\left[\frac{1}{H}\left(N - H\tan D - \frac{X_{RM} + X_{LM}}{2(1 - \cos B)}\right)\right] \quad (27)$$

Simplifying equation (27), the desired expression for SAI angle is obtained, as follows:

$$SAI = \arctan\left[\frac{1}{H}\left(N - \frac{X_{RM} + X_{LM}}{2(1 - \cos B)}\right) - \tan D\right] \quad (28)$$

It is noted that equation (28) expresses the value of the SAI angle in terms of the measured X-axis displacement components $X_{RM}$, $X_{LM}$, the measured steering angle B, the camber angle D, the known SAI offset N, and the measured, or otherwise known, value of axle height H.

Although positive offset of the steering axis intersection point 36 from the contact point 14 has been assumed for the purpose of deriving equation (28), it should be appreciated that equation (28) also applies in the case of a negative offset, such as shown in FIG. 7A. This can be understood by reference to FIG. 2B which shows that the directions of the X-axis displacements $X_S$ due to SAI offset, SAI angle, and camber angle are opposite where a negative offset exists than where a positive offset exists. Therefore, $X_{RM} + X_{LM}$ will produce a negative value resulting in $R_{MS}$ having a negative value, as can be seen by reference to equation (21). Referring to equation (23) and FIG. 7A, this negative value of $R_{MS}$ will tend to positively increase $R_S$, making $R_S$ equal to the sum of N and the magnitude of $R_{MS}$, minus the distance $R_D$ due to camber. Equation (28) also accounts for a negative camber angle which, as equation (24) indicates, would produce a negative value for $R_D$. Since the calculated distance $R_{MS}$ includes camber and since a negative camber increases the value of $R_{MS}$ for a positive offset of the steering axis intersection point, the negative value of $R_D$ operates to cancel out the increase in value of $R_{MS}$, as can be seen in equation (23) and by reference to vertical line 44 of FIG. 6A from which $R_D$ and $R_{MS}$ are measured. Moreover, it should be apparent that equation (28) is also valid in the unlikely case of a steerable wheel exhibiting negative SAI offset.

For calculation of the SAI angle for the right wheel 12', equation (28) should be modified to account for the different conventions used to assign positive and negative signs to the various angles and distances. Specifically, the positive and negative conventions for camber angle, SAI angle, and SAI offset are simply reversed for right wheel 12' than they are for left wheel 12. However, as can be seen in FIG. 2A, the convention used for the X-axis is the same for both left and right wheels. Additionally, what constitutes leftward or rightward of steering of the wheel is the same for both the left and right wheels. As FIG. 2B indicates, the result is that the directions of both the X and Y displacements are opposite for right wheel 12' than they are for left wheel 12, even though both wheels may have, for example, positive SAI angle, camber angle, and SAI offset. To account for these different conventions, equation (28) can be modified slightly, as follows:

$$SAI = \arctan\left[\frac{1}{H}\left(N - \frac{k(X_{RM} + X_{LM})}{2(1 - \cos B)}\right) - \tan D\right] \quad (29)$$

where:
k = 1 if the calculation is for the left wheel and
k = −1 if the calculation is for the right wheel.

The value of the SAI angle may also be calculated using the measured values of the Y-axis components of displacement for a given steering angle. This calculation is similar to that above. The measured value of displacement along the Y-axis, $Y_{RM}$, is equal to the algebraic sum of the Y-axis displacement due to caster angle and caster offset and the Y-axis displacement due to the SAI offset and combined camber and SAI angle. This can be expressed as follows, for a steering angle B to the right, using the algebraic signs from the chart of FIG. 2B and assuming positive caster trail and positive offset:

$$Y_{RM} = Y_C + Y_S \quad (30)$$

Similarly, the measured value of displacement along the Y-axis for a steering angle B to the left, can be expressed as follows:

$$Y_{LM} = Y_C - Y_S \quad (31)$$

By subtracting equation (31) from equation (30) and solving for $Y_S$, the following expression is obtained:

$$Y_S = \frac{Y_{RM} - Y_{LM}}{2} \quad (32)$$

By inspection of FIGS. 6B and 7B, the following relationship is apparent:

$$R_{MS} = \frac{Y_S}{\sin B} = \frac{Y_{RM} - Y_{LM}}{2 \sin B} \quad (33)$$

By inspection of FIG. 6A, the following relationship is apparent:

$$N = R_D + R_{MS} + R_S \quad (34)$$

Solving equation (34) for $R_S$ yields:

$$R_S = N - R_D - R_{MS} \quad (35)$$

The distance $R_D$ can be calculated from the known camber angle D as follows:

$$R_D = H \tan D \quad (36)$$

Substituting the expression for $R_{MS}$ from equation (33) and the expression for $R_D$ from equation (36) into equation (35) yields:

$$R_S = N - H \tan D - \frac{Y_{RM} - Y_{LM}}{2 \sin B} \quad (37)$$

By inspection of FIGS. 6A and 7A, it can be seen that the SAI angle can be determined from $R_S$ using the following equation:

$$SAI = \arctan \frac{R_S}{H} = \quad (38)$$

$$\arctan\left[\frac{1}{H}\left(N - \frac{Y_{RM} - Y_{LM}}{2 \sin B}\right) - \tan D\right]$$

As previously discussed, to account for the use of a different convention for the left and right steering directions than for SAI angle, camber angle, and SAI offset, equation (38) can be modified as follows so that it will be applicable to calculations of the SAI angle for both the left and right steerable wheels:

$$SAI = \arctan\left[\frac{1}{H}\left(N - \frac{k(Y_{RM} - Y_{LM})}{2 \sin B}\right) - \tan D\right] \quad (39)$$

where:
k = 1 if the calculation is for the left wheel and
k = −1 if the calculation is for the right wheel.

It is noted that equation (39) expresses the value of the SAI angle in terms of the measured Y-axis displacement components $Y_{RM}$ and $Y_{LM}$, the measured steering angle B, the camber angle D, the known SAI offset N, and the measured or otherwise known, value of axle height H.

As described above, the value of the SAI angle is calculated using the measured value of the X-axis components of displacement for a given steering angle as represented by equation (29). The value of the SAI angle can also be calculated using the measured value of the Y-axis components of the displacement and, without use of the X-axis component, as represented by equation (39). Preferably, equation (39) is used to determine SAI angle, as the Y-axis displacements are typically larger in magnitude than the X-axis displacements for the same steering angle B. Alternatively, the average value of the two calculated values of SAI angle may be used as the desired SAI angle.

The foregoing calculations are based on the assumption that the caster component $X_C$ of the X-axis displacement and the camber/SAI component $X_S$ of the X-axis displacement, as well as the components $Y_C$ and $Y_S$ of the Y-axis displacement, have the same magnitude for a left turn of the steering angle B as they do for a right turn of the steering angle B. The assumed symmetry of the camber/SAI components $X_S$, $Y_S$ of the measured X and Y-axes displacement permits those components to be subtracted out of the equations, thereby enabling determination of the caster components $X_C$, $Y_C$ of the measured X and Y-axes displacements, as can be seen by reference to the derivation of equation (3) from equations (1) and (2) and the derivation of equation (11) from equations (9) and (10). Similarly, the assumed symmetry of the caster components $X_C$, $Y_C$ of the measured X and Y-axes displacements permits those components to be subtracted out of the equations, thereby enabling determination of the camber/SAI components $X_S$, $Y_S$ of the measured X and Y-axes displacements, as can be seen by reference to the derivation of equation (19) from equations (17) and (18) and the derivation of equation (32) from equations (30) and (31). In order for this assumption to be true, the wheel undergoing measurement must initially be positioned in the straight ahead direction. This can be accomplished using the previously described measuring apparatus by locating the wheel on the rollers 86 and 86' and steering the wheel until the rotary encoder 78 indicates that it is at its reference position (which corresponds to the straight ahead direction). It will, of course, be understood by those skilled in the art that determination of the straight ahead position using encoder 78 can be done in a variety of ways, such as in software using the digital computer described below.

The calculations of the caster angle and the SAI angle are suitably executed by a digital computer 150, as represented in FIG. 10. The measured values of steering angle, Y-axis displacement and/or X-axis displacement are supplied to the computer inputs from the encoders 78, 82 and 84, respectively. The values of axle height, camber angle, caster offset, and SAI offset are supplied to the computer input by a manual input device 152 using predetermined values. The computer 150 is programmed to calculate the caster angle in accordance with equations (8) or (16), or both, as discussed above It is also programmed to calculate the SAI angle in accordance with equations (29) or (39), or both, as discussed. The calculated values are suitably output by the computer to a display 154 and a printer 156.

Although the description of this invention has been given with reference to a particular embodiment, it is not to be construed in a limiting sense. Many variations and modifications will now occur to those skilled in the art. For a definition of the invention, reference is made to the appended claims.

What is claimed is:

1. A method of determining the caster angle of a steerable wheel on a vehicle, the wheel being mounted for rotation about an axle on said vehicle and having a tread for engaging a road, the vehicle having a fore-and-aft axis and a transverse axis, said method including the steps of:

turning the wheel right and left relative to the fore-and-aft axis through the same measured steering angle, measuring the linear displacement, along one of said axes, of a point on said wheel in a plane parallel to said axes with the wheel turned rightward and leftward to said measured steering angle, respectively, and calculating the caster angle using the measured displacement, the steering angle, the caster offset, and the axle height above said plane.

2. The invention as defined in claim 1 wherein said calculating step is performed in accordance with the following functional relationship:

$$A = \arctan\left[\frac{1}{H}\left(\frac{X_{LM} - X_{RM}}{2 \sin B} - CO\right)\right]$$

where:
A = caster angle,
B = steering angle,
$X_{RM}$ = X-axis displacement for right steering angle B,
$X_{LM}$ = X-axis displacement for left steering angle B,
CO = caster offset.

3. The invention as defined in claim 1 wherein said calculating step is performed in accordance with the following functional relationship:

$$A = \arctan\left[\frac{1}{H}\left(\frac{Y_{RM} + Y_{LM}}{2(1 - \cos B)} - CO\right)\right]$$

where:
A = caster angle,
B = steering angle,
$Y_{RM}$ = Y-axis displacement for right steering angle B,
$Y_{LM}$ = Y-axis displacement for left steering angle B,
H = axle height, and
CO = caster offset.

4. A method of determining the SAI angle of a steerable wheel on a vehicle, the wheel being mounted for rotation about an axle on said vehicle and having a tread for engaging a road, the vehicle having a fore-and-aft axis and a transverse axis, said method including the steps of:

turning the wheel right and left relative to the fore-and-aft axis through the same measured steering angle, measuring the linear displacement, along one of said axes, of a point on said wheel in a plane parallel to said axes with the wheel turned rightward and leftward to said measured steering angle, respectively, and calculating the SAI angle using the measured displacement, the steering angle, the steering axis inclination offset, the axle height above said plane and the camber angle of the wheel.

5. The invention as defined in claim 4 wherein said calculating step is performed in accordance with the following functional relationship:

$$SAI = \arctan\left[\frac{1}{H}\left(N - \frac{k(X_{RM} + X_{LM})}{2(1 - \cos B)}\right) - \tan D\right]$$

where:
SAI = steering axis inclination angle,
B = steering angle,
$X_{RM}$ = X-axis displacement for right steering angle B,
$X_{LM}$ = X-axis displacement for left steering angle B,
H = axle height,
N = steering axis inclination offset,
D = camber angle, and
k = 1 if the wheel is mounted on the left side of the vehicle or
k = −1 if the wheel is mounted on the right side of the vehicle.

6. The invention as defined in claim 4 wherein said calculating step is performed in accordance with the following functional relationship:

$$SAI = \arctan\left[\frac{1}{H}\left(N - \frac{k(Y_{RM} - Y_{LM})}{2 \sin B}\right) - \tan D\right]$$

where:
SAI = steering axis inclination angle,
$Y_{RM}$ = Y-axis displacement for right steering angle B,
$Y_{LM}$ = Y-axis displacement for left steering angle B,
H = axle height,
N = steering axis inclination offset,
B = steering angle,
D = camber angle, and k=1 if the wheel is mounted on the left side of the vehicle or k=−1 if the wheel is mounted on the right side of the vehicle.

7. Apparatus for use in determining the caster or steering axis inclination angle of a steerable wheel on a vehicle, said apparatus comprising:

a stationary frame, a support member for supporting said steerable wheel, said support member being mounted on said frame for linear movement along the fore-and-aft axis and the transverse axis of said vehicle and for rotary motion about a rotation axis perpendicular to the fore-and-aft axis and transverse axis, means for measuring the angle of rotation of said support member relative to said fore-and-aft axis when said steerable wheel is turned to a steering angle in both directions from the straight ahead position, means for measuring the linear displacement of said support member along one of said transverse and fore-and-aft axes when said steerable wheel is turned to said steering angle in both directions, and a computer having inputs for receiving signals corresponding to said steering angle, said linear displacement along said one axis, the caster offset, and the axle height, said computer being programmed to calculate the caster angle in accordance with a functional relationship of said input signals.

8. The invention as defined in claim 7 wherein said functional relationship is as follows:

$$A = \arctan\left[\frac{1}{H}\left(\frac{X_{LM} - X_{RM}}{2 \sin B} - CO\right)\right]$$

where:
A = caster angle,
B = steering angle,
$X_{RM}$ = X-axis displacement for right steering angle B,
$X_{LM}$ = X-axis displacement for left steering angle B,
H = axle height, and
CO = caster offset.

9. The invention as defined in claim 7 wherein functional relationship is as follows:

$$A = \arctan\left[\frac{1}{H}\left(\frac{Y_{RM} + Y_{LM}}{2(1 - \cos B)} - CO\right)\right]$$

where:
A = caster angle,
B = steering angle,
$Y_{RM}$ = Y-axis displacement for right steering angle B,
$Y_{LM}$ = Y-axis displacement for left steering angle B,
H = axle height, and
CO = caster offset.

10. The inventions as defined in claim 7, wherein said computer further includes inputs for receiving signals corresponding to the camber angle and the steering axis inclination offset, said computer being programmed to calculate the steering axis inclination angle in accordance with a functional relationship of said input signals.

11. The invention as defined in claim 10 wherein said functional relationship is as follows:

$$SAI = \arctan\left[\frac{1}{H}\left(N - \frac{k(X_{RM} + X_{LM})}{2(1 - \cos B)}\right) - \tan D\right]$$

where:
SAI = steering axis inclination angle,
B = steering angle,
$X_{RM}$ = X-axis displacement for right steering angle B,
$X_{LM}$ = X-axis displacement for left steering angle B,
H = axle height,
N = steering axis inclination offset,
D = camber angle, and
k = 1 if the wheel is mounted on the left side of the vehicle or
k = −1 if the wheel is mounted on the right side of the vehicle.

12. The invention as defined in claim 10 wherein said functional relationship is as follows:

$$SAI = \arctan\left[\frac{1}{H}\left(N - \frac{k(Y_{RM} - Y_{LM})}{2 \sin B}\right) - \tan D\right]$$

where:
SAI = steering axis inclination angle,
$Y_{RM}$ = Y-axis displacement for right steering angle B,
$Y_{LM}$ = Y-axis displacement for left steering angle B,
H = axle height,
N = steering axis inclination offset,
B = steering angle,
D = camber angle, and
k = 1 if the wheel is mounted on the left side of the vehicle or
k = −1 if the wheel is mounted on the right side of the vehicle.

* * * * *